May 2, 1967 W. B. STEIN 3,316,617
TWO-PIECE CUTOFF TOOL HAVING CHAMFERING PROPERTIES
Filed March 12, 1965 2 Sheets-Sheet 1

INVENTOR.
WILLIAM B. STEIN
BY Freeman + Taylor
ATTORNEYS

May 2, 1967   W. B. STEIN   3,316,617
TWO-PIECE CUTOFF TOOL HAVING CHAMFERING PROPERTIES
Filed March 12, 1965   2 Sheets-Sheet 2

INVENTOR.
WILLIAM B. STEIN
BY Freeman & Taylor
ATTORNEYS

United States Patent Office 3,316,617
Patented May 2, 1967

3,316,617
TWO-PIECE CUTOFF TOOL HAVING
CHAMFERING PROPERTIES
William B. Stein, Barberton, Ohio, assignor to The Warner & Swasey Company, Cleveland, Ohio, a corporation of Ohio
Filed Mar. 12, 1965, Ser. No. 439,265
9 Claims. (Cl. 29—97)

This invention relates to the art of cutting tools and in particular has reference to a new and improved type of cutting tool that is characterized by the fact that the same can perform a plurality of cutting operations, including the specific cutting operations of cutoff, grooving and chamfering.

In Novkov U.S. Patent 2,964,833, there was illustrated a new and improved type of replacement insert for cutting tools that had particular utility in the art of effectuating cutoff operations. This insert, of pencil-like configuration, included a shank with a similarly contoured cutting tip projecting coextensively from one end thereof, with the insert being supported top and bottom during cutoff so as to have a requisite degree of rigidity.

While cutoff tools of the type just described have been widely accepted in commercial manufacture, it has, nonetheless, been found that the same can be modified and improved to extend the over-all range of operating use, while simultaneously reducing the manufacturing cost to produce the same.

It has been found that the shank can be modified to provide a cutout area or pocket wherein an additional component having the configuration of a chamfering plate can be provided to rest on the shank to the rear of the cutting tip.

It has also been found that the insert in question can be effectively modified by altering the cutting tip so that the same rests on top of the shank adjacent the front end thereof and overhangs the front edge of the shank. Such modification provides, in effect an offset area behind the tip for reception of a chamfering plate.

By this relocation of the cutting tip and addition of a chamfering element that rests on the shank, applicant simultaneously achieves the dual advantage of reducing manufacturing costs and extending the range of operating use for replacement inserts so that one insert can be used in the performance of two separate machining operations.

Production of an improved cutting insert having the above advantages accordingly becomes the principal object of this invention, with other objectives of this invention becoming more apparent upon a reading of the following brief specification, considered and interpreted in the light of the accompanying drawings.

Figure 1:
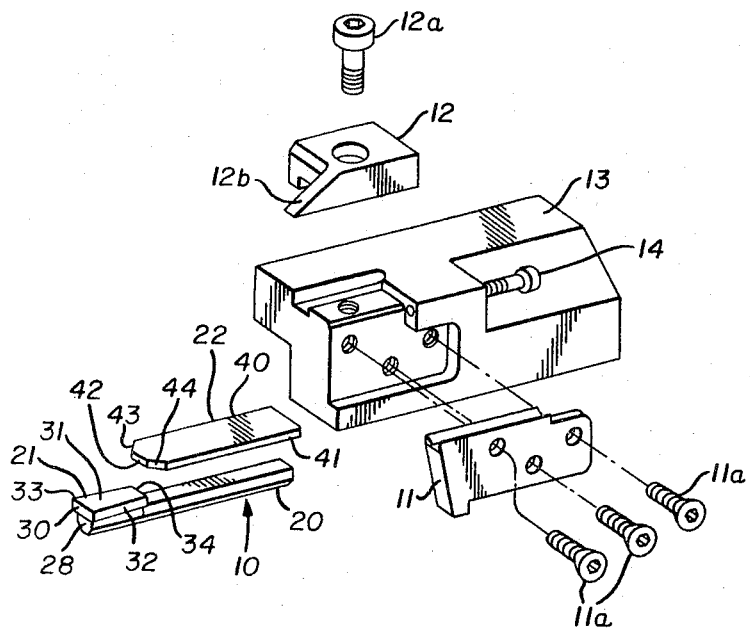
Figure 2:
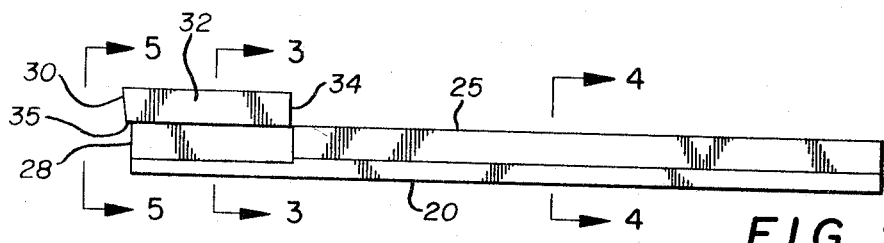
Figure 3:
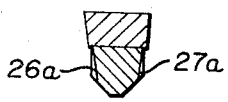
Figure 4:
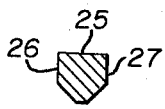
Figure 5:
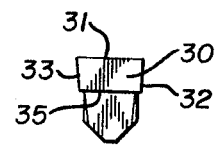
Figure 6:
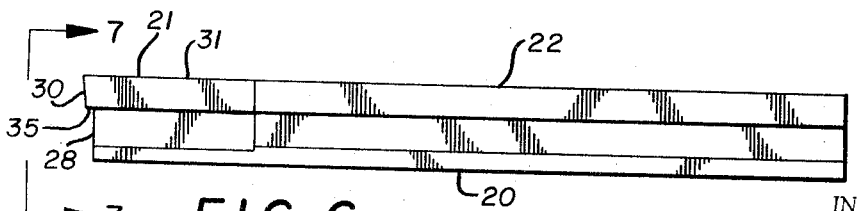
Figure 8:
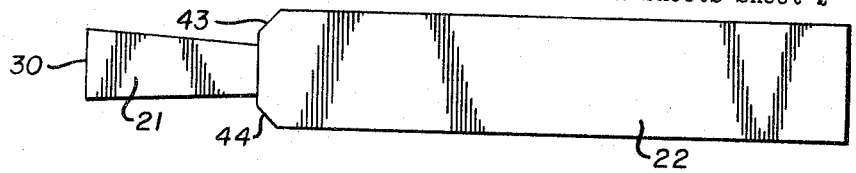
Figure 7:
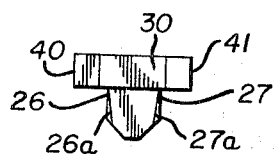
Figure 9:
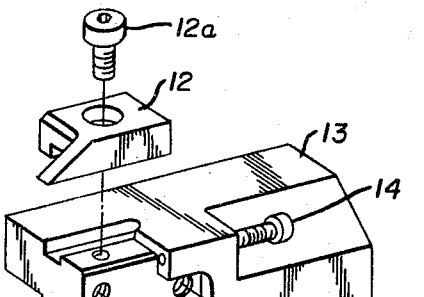
Figure 10:
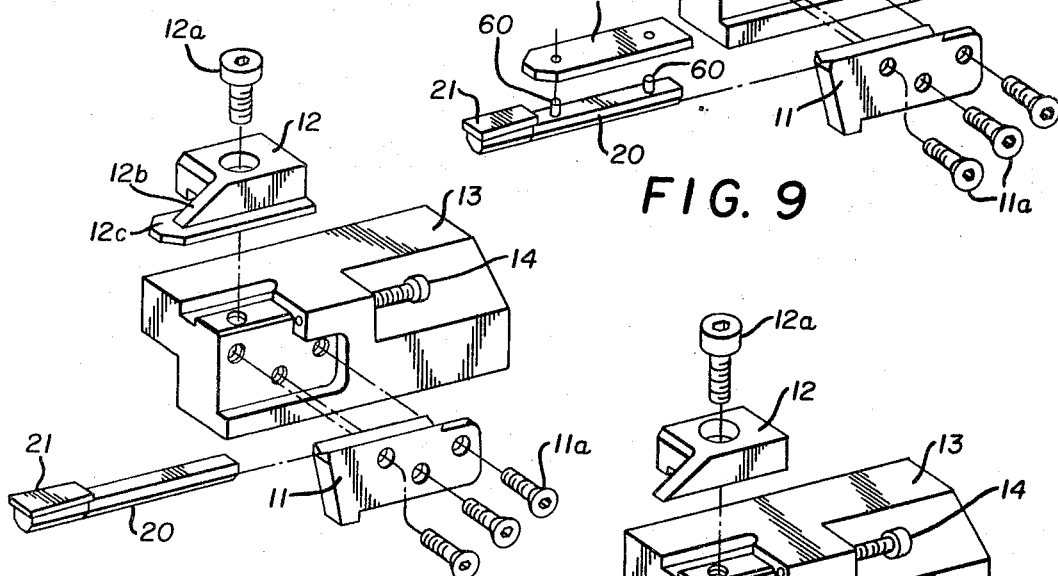

Of the drawings:
FIGURE 1 is an exploded perspective view of the improved insert and cutoff tool.
FIGURE 2 is a side elevation showing the shank and tip portion of the overall insert bit.
FIGURES 3 and 4 are vertical sectional views taken on the lines 3—3 and 4—4 of FIGURE 2.
FIGURE 5 is an end elevation taken on the lines 5—5 of FIGURE 2.
FIGURE 6 is a side elevation of the assembled insert.
FIGURE 7 is an end elevation of the assembled insert shown in FIGURE 6.
FIGURE 8 is a top plan view of the frontal portion thereof.
FIGURE 9 is a perspective view of a modified form of the invention and showing one form of improved interconnecting means.
FIGURE 10 is a perspective view of a still further modified form of the invention.

Figure 11:
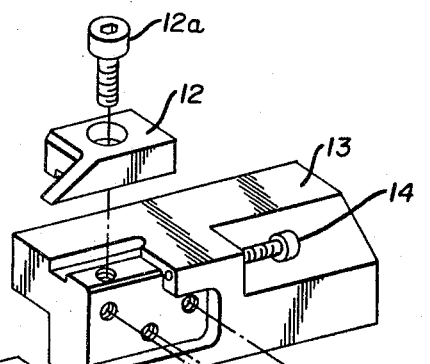
Figure 12:
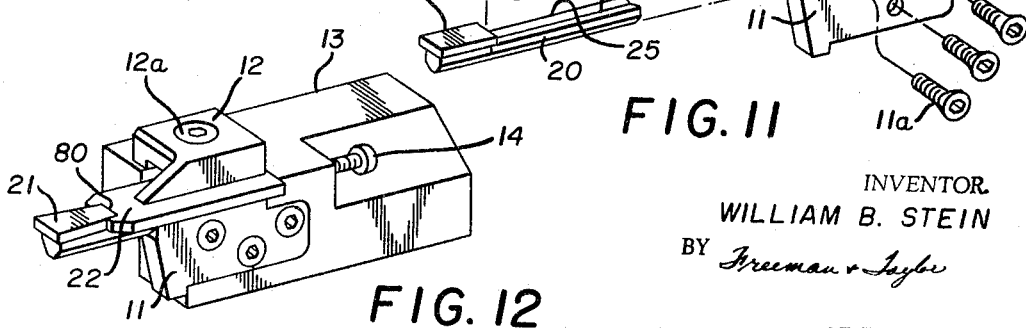

FIGURES 11 and 12 are perspective views of still further modified forms of the invention and showing alternate interconnecting means being associated with the insert per se.

Referring now to the drawings and in particular to FIGURE 1 thereof, the improved insert, generally designated by the numeral 10 is of two-piece construction and is operably clamped in place between a support blade 11 and the clamping block 12, with both of the just described members being releasably attached to the tool body 13 in a manner fully and completely described in U.S. Patent 2,964,833.

Accordingly, a detailed description will not be undertaken with reference to the support blade 11, clamping block 12 and tool body 13, with it sufficing to say that screws 11a, 11a clamp the support blade 11 in place, while screw 12a serves to draw the clamping arm 12b of block 12 into clamping engagement with the top surface of the insert 10, with adjustment screw 14 serving to locate the insert longitudinally with respect to the support blade 11 and the clamping block 12.

Referring again to FIGURE 1 for a detailed description of the insert 10 per se, it will first be noted that the same consists of an elongate shank 20, a cutting tip 21 and a chamfering plate 22, with the arrangement being such that the cutting tip 21 is brazed to the top surface of the shank 20 adjacent one end thereof while the chamfering plate 22 is loosely received on top of the shank 20 just rearwardly of the tip 21, as clearly shown in FIGURE 6 of the drawings.

The cross-sectional contour of the shank 20 is best illustrated in FIGURE 4 of the drawings, wherein a top surface 25, opposed side surfaces 26, 27 and a V-shaped bottom surface are provided. Preferably, and as shown in FIGURE 3, the side surfaces 26 and 27 are tapered as at 26a and 27a adjacent the forward end 28 of the shank 20 for the purpose of providing the usual side clearance.

With reference to the cutting tip 21, the same is shown of plate-like configuration in plan and includes a frontal cutting edge 30, a top surface 31 and rearwardly converging side surfaces 32 and 33, as well as a rear surface 34 and a bottom surface 35. Preferably, and as shown in FIGURE 6, the front surface 30 is tapered inwardly from the top to bottom for clearance purposes and overhangs the front edge 28 of the shank 20, with the bottom surface 35 being brazed or otherwise fixedly secured to the top surface 25 of shank 20, as clearly shown in FIGURES 1, 2, 3, 5 and 6 of the drawings.

It should be noted that while a wafer-like cutting tip 21 is shown the same could be a tip such as shown in U.S. 2,964,833 or a one piece insert. In such cases the shank would be offset from just behind the tip to the rear of the shank to accommodate the chamfering plate 22.

Turning next to the chamfering plate 22, the same is also of plate-like configuration in plan, with the thickness of the plate 22 corresponding substantially to the thickness of the cutting tip 21 in the preferred embodiment of the invention so that their top surfaces are substantially coplanar. As clearly shown in FIGURE 1, the plate 22 has opposed side edges 40 and 41, with the transverse width between these edge surfaces being considerably greater than the width between the edge surfaces and the opposed side surfaces 26 and 27 of shank 20 so that an overhanging condition is created as shown in FIGURE 7 of the drawings.

When a tip such as is shown in U.S. 2,964,833 or a one piece insert is used it should be understood that the chamfering plate 22 will again have a thickness sufficient to make the top of plate 22 and the tip substantially coplanar.

To the end of attaining a chamfering effect, the frontal edge of the chamfering plate 22 is provided with a front surface 42 and divergent side surfaces 43 and 44 that respectively connect the front edge 42 with opposed side surfaces 40 and 41, as clearly shown in FIGURE 1 of the drawings.

In this regard, the plate 22, when seated in place will provide a tool whose top plan view is best shown in FIGURE 8 of the drawings, with the divergent side surfaces 43 and 44 being adapted for use for chamfering surfaces following effectuation of a cutoff operation by the cutoff edge 30.

In use or operation of the improved insert 10, it will first be assumed that the component parts have been assembled to the operating position with the insert 10 being clamped between the support blade 11 and the clamping block 12 so as to be rigidly supported with respect to the tool body 13. At this time a cutoff operation may be effectuated in the normal fashion by feeding the cutting edge 30 longitudinally into the path of the rotating work, as clearly shown in U.S. Patent 2,964,833.

When such cutoff has been effectuated and it is desired to conduct a chamfering operation, the carriage need only be shifted slightly, followed by reinsertion of the cutting tool, at which time either the edge 43 or 44 will effectuate the requisite chamfering. In grooving operations the tool is merely fed into the groove whereupon edges 43, 44 will effectuate the desired chamfering.

With reference to the composition of the component parts just described, the shank 20 may be of ordinary tool steel, while the cutting tip 21 is preferably of carbide material to effectuate most efficient cutting. Carbide type of stock material is preferred for use in the chamfering plate 22, although it is to be understood that the material composition can be varied in accordance with the particular job requirements under consideration although the tip 21 and plate 22 will normally be of the same material.

The modified form of the invention shown in FIGURE 9, merely envisions the use of locating pins 60, 60 received in appropriate openings of the chamfering plate 22 with such pins preventing longitudinal or transverse shifting between the shank 20 and plate 22. These pins are shown carried by shank 20 but it should be understood that they could be carried by plate 22 and be received in openings in the shank with equal effectiveness.

With reference to the modified form of the invention shown in FIGURE 10, the clamping block 12 has its arm portion 12b thereof modified to include a depending offset 12c which corresponds in depth of projection to the thickness of the cutting tip 21 so as to still retain the requisite clamping pressure while eliminating the need for a chamfering plate per se.

In the form of the invention shown in FIGURE 11, a groove 70 is provided in the top face 25 for reception of a depending rib 71 that projects from the underface of the chamfering plate 22, with such interlocking arrangement precluding transverse shifting. By like token, in FIGURE 12, a notch 80 is cut in the forward end of the chamfering plate 22 so as to permit the plate to fit around the rear portion of cutting tip 21.

It should also be noted that in the form of the invention shown the front edge 42 of chamfering plate 22 abuts the rear edge 34 of cutting tip 21. It has also been found that plate 22 can be spaced from the tip 21 to provide for adjustment of the plate 22 relatively of the tip. In such construction screw 14 will serve to adjust the plate longitudinally of the shank while a second screw would be added below screw 14 for adjustment of the insert per se.

While a full and complete description of the invention has been set forth in accordance with the dictates of the patent statutes, it is to be understood that the invention is not intended to be limited to the specific embodiments herein shown.

Accordingly, modifications of the invention may be resorted to without departing from the spirit hereof or the scope of the appended claims.

What is claimed is:
1. An insert bit of the character described, comprising;
    (A) an elongate shank including top, bottom and opposed sidewall surfaces, as well as front and rear ends;
    (B) a cutting tip brazed to said top surface of said shank in overhanging relationship to the front edge thereof; and
    (C) a chamfering plate adapted to freely seat on said top surface of said shank behind the rear edge of said cutting tip;
    (D) said chamfering plate and said cutting tip being of substantially equal thickness, whereby the top surfaces thereof may be longitudinally aligned in coplanar relationship with each other.
2. The insert of claim 1 further characterized by the fact that the width of said chamfering plate exceeds the width of said shank and said tip; said chamfering plate having divergent cutting edges tapering rearwardly and outwardly from the front edge thereof.
3. A cutting tool of the character described, comprising;
    (A) a tool body;
    (B) a support blade having a bit receiving marginal edge and being reasonably secured to said tool body in non-shiftable relationship therewith;
    (C) a clamping block shiftably mounted on said tool body and having an elongated clamping surface longitudinally overlying a substantial portion of said bit receiving edge;
    (D) an elongate shank having one edge received on said bit receiving edge;
    (E) a cutting tip brazed to the top surface of said shank and overhanging the frontal portion thereof for cutting purposes; and
    (F) means for transmitting clamping pressure from the rearward portion of said clamping block to the top surface of said shank.
4. The device of claim 3 further characterized by the fact that said means include a plate corresponding in thickness to the thickness of said cutting tip.
5. The device of claim 3 further characterized by the fact that said last mentioned means include a depending flange on said clamping block having a thickness approximating the thickness of said cutting tip.
6. A cutting tool of the character described, comprising;
    (A) a tool body;
    (B) a support blade having a bit receiving marginal edge and being releasably secured to said tool body in non-shiftable relationship therewith;
    (C) a clamping block shiftably mounted on said tool body and having an elongated clamping surface longitudinally overlying a substantial portion of said bit receiving edge;
    (D) an elongate shank having one edge received on said bit receiving edge;
    (E) a cutting tip brazed to the top surface of said shank and overhanging the frontal portion thereof for cutting purposes; and
    (F) a chamfering plate adapted to be clamped
        (1) on the top surface of said shank,
        (2) rearwardly of said cutting tip,
        (3) beneath the rearward portion of said clamping surface;
        (4) said plate having a thickness approximating the thickness of said cutting tip, whereby clamping pressure from said clamping edge can be applied to the top surfaces of said tip and said plate.
7. The device of claim 6 further characterized by the fact that said chamfering plate has a width greater than the width of said shank and tip and further has divergent frontal surfaces that extend rearwardly and outwardly from the end thereof nearest said cutting tip.

8. A cutting tool of the character described, comprising:
- (A) a tool body;
- (B) a support blade having a bit receiving marginal edge and being releasably secured to said tool body in non-shiftable relationship therewith;
- (C) a clamping block shiftably mounted on said tool body and having an elongated clamping surface longitudinally overlying a substantial portion of said bit receiving edge;
- (D) an elongate shank having one edge received on said bit receiving edge;
- (E) a cutting tip disposed on one end of said shank;
- (F) said shank having an elongate pocket disposed in its top surface behind said cutting tip;
- (G) a chamfering plate adapted to be clamped
  - (1) on the top surface of said shank in said pocket;
  - (2) beneath the rearward portion of said clamping surface;
  - (3) said plate having a thickness approximating the thickness of said cutting tip, whereby clamping pressure from said clamping edge can be applied to the top surfaces of said tip and said plate.

9. The device of claim 8 further characterized by the presence of means for adjusting said chamfering plate longitudinally of said shank.

No references cited.

WILLIAM W. DYER, Jr., *Primary Examiner.*

HARRISON L. HINSON, *Examiner.*